Sept. 26, 1950
B. F. FITCH
2,523,691
COMBINED THERMOMETER AND SAMPLING UNIT
Filed June 21, 1949
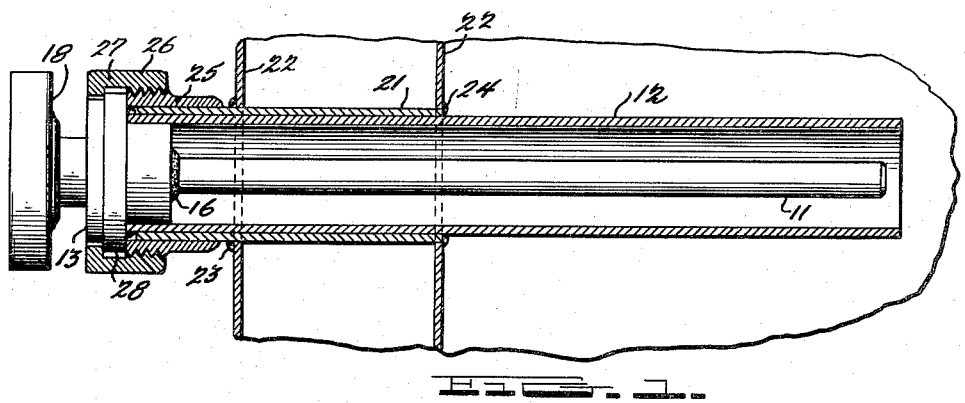
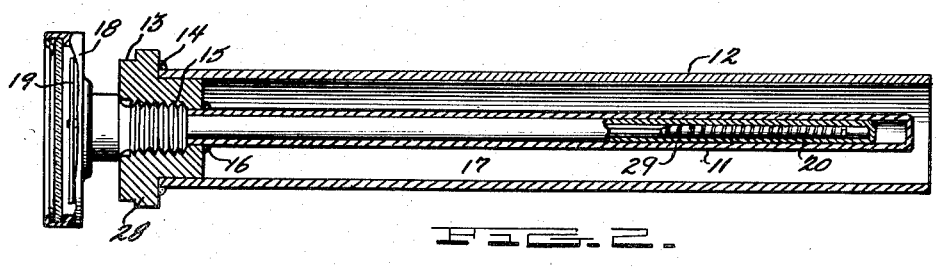
INVENTOR.
BENJAMIN F. FITCH
BY
ATTORNEY Patented Sept. 26, 1950

2,523,691

UNITED STATES PATENT OFFICE 2,523,691

COMBINED THERMOMETER AND SAMPLING UNIT

Benjamin F. Fitch, Newport, R. I., assignor to National Fitch Corporation, a corporation of Delaware Application June 21, 1949, Serial No. 100,407

3 Claims. (Cl. 73—354)

This invention relates to combined temperature measuring and sampling devices and more particularly to a device of that character which is adapted to be detachably supported in the wall of a container filled with dry powdered or granular material.

In connection with containers for storing and transporting flour in bulk, for example, it is desirable, if not necessary, to know the temperature of the flour, and also to obtain samples from time to time. I am cognizant of the prior art devices such as that shown in the United States patent to Proudlock 2,331,227, which issued October 5, 1943. Devices such as the one shown in that patent may accomplish the purpose of the present invention, but in practice they are open to several objections. First, the roof hatches of the containers must be opened in order to lower the instrument into the stored material. This involves considerable time and labor. Second, the constant handling of these devices necessary to their use, is liable to adversely affect the thermometer and other associated working parts.

Accordingly, it is an object of this invention to provide a unitary construction for combined thermometer and sampling devices which will overcome these objections.

Another object is to provide such a device which can be semi-permanently mounted in a wall of the container so that the temperature of the contained material can be ascertained, at any time, without the necessity of opening the container roof hatches or other parts.

It is a further object of this invention to provide a means, closely associated with the thermometer for sampling the contained material, without removing any of the main or filling closures.

Other objects and advantages of my improved construction will be apparent from the following description taken in conjunction with the accompanying drawing in which:

Figure 1 is a side elevation, partially in section, of a preferred embodiment of my device showing also a preferred method of attachment to a container wall, Figure 2 is a side sectional view of the device of Figure 1 removed from the container wall.

The sampling device comprises a pair of concentric tubes 11 and 12, each connected at one end to a hollow plug-like fitting 13, which latter may be welded to the outer tube 12 along its periphery as indicated at 14 and to the inner tube 11 as indicated at 16. The hollow fitting has a drilled and tapped opening 15, the innermost end of which having a diameter only somewhat greater than the outside diameter of tube 11. Tube 11, which is closed at its inner end, is inserted into this opening. A tubular sampling chamber 17 open at one end is thus defined by the two tubes 11 and 12 and the end fitting 13. This chamber comprises the receptacle of the sampling device.

A thermometer indicated generally by the numeral 18 consists of an indicating means 19, and a thermally responsive actuating element 20. The element 20, is housed within an enclosing tube 29 which is disposed within the tube 11, in close fitting relation thereto, so that it will readily respond to temperatures of the material filling the sampling chamber 17.

To provide for a rigid, detachable mounting in the wall of the container, a tube 21 (Figure 1) having an inside diameter slightly greater than the outside diameter of tube 12 is mounted in an opening in the partition of container wall 22, as shown. In the event that the wall 22 is metallic, or has metallic sheathing, the tube 21 may be welded around its periphery as indicated at 23 and 24. A ferrule or sleeve member 25 having an outside threaded portion may be shrink-fitted on tube 21. Nut 26 mates with the threaded portion of member 25, and has an extension 27 which is inwardly flanged to engage the shoulder 28 of the fitting 13. By means of this nut, the thermometer and sampling cup assembly are rigidly held in the container wall, with the sampling chamber extending into the container where it will fill with the material contained therein and with the thermometer dial indicator extending outside the container for convenient reading.

When a sample of the material is desired, the nut 26 is loosened and the thermometer and sampling assembly removed from the container wall.

The mounting fittings shown are illustrative of a principle, and known expedients are within contemplation.

The thermometer shown is a well known type, and has many obvious equivalents.

I claim:

1. A combined thermometer and sampling device of the type adapted to be detachably supported in a wall of a storage container to sample and measure the temperature of material stored therein, comprising in combination: an outer cylindrical tube; a hollow fitting permanently secured to one end of said tube; an inner tube of substantially less diameter than the said outer tube, being closed at one end and permanently secured to said fitting at its other end in concentric relation to said outer tube, the space between the two tubes defining an open-ended sampling chamber; and a thermometer the outer casing of which is mounted within said hollow fitting and having a temperature indicating dial mounted outwardly thereof, the temperature responsive element of said thermometer being supported by and housed within said inner tube.

2. A combined thermometer and sampling device of the type adapted to be detachably supported in a wall of a storage container to sample and measure the temperature of material stored therein, comprising in combination: a cylindrical plug-like member having an axial bore therein; an outer cylindrical tube permanently secured to said member at one end thereof, the other end being open; an inner cylindrical tube of substantially less diameter than said outer tube, closed at one end and permanently secured to said plug member at its other end in concentric relation with said first tube, the space between said tubes defining an open ended sampling chamber; and a thermometer supported within said plug member and having a temperature indicating dial mounted outwardly thereof the temperature responsive element of said theremometer being supported by and housed within said inner tube.

3. In combination with a combined thermometer and sampling device as defined by claim 1: a tubular receptacle extending through said wall, protruding a short distance outwardly therefrom, and having an externally threaded portion adjacent the outer end thereof; and a flanged retainer nut engaged with the threaded portion of said receptacle and adapted to engage said plug-like member whereby said device may be detachably supported in said wall.

BENJAMIN F. FITCH.

REFERENCES CITED

The following references are of record in the file of this patent:

UNITED STATES PATENTS

| Number | Name | Date |
|---|---|---|
| 2,184,472 | Sand | Dec. 26, 1939 |
| 2,270,211 | Bruns | Jan. 13, 1942 |
| 2,331,227 | Proudlock | Oct. 5, 1943 |